Patented Aug. 18, 1953

2,649,462

UNITED STATES PATENT OFFICE 2,649,462

METHOD FOR STABILIZING AND PURIFYING PHENYLACETALDEHYDE

David C. Young, Midland, Mich., assignor to The Dow Chemical Company, Midland, Mich., a corporation of Delaware No Drawing. Application April 11, 1952,
Serial No. 281,917

6 Claims. (Cl. 260—340)

This invention concerns a method for stabilizing phenylacetaldehyde. It further relates to a method of obtaining phenylacetaldehyde in pure form.

It is known that phenylacetaldehyde may be polymerized in the presence of such acids as sulphuric acid or hydrochloric acid. In this manner, very low yields of the tribenzyl trioxane are obtained, even after long polymerization times. Even in the absence of such catalysts, pure phenylacetaldehyde deteriorates progressively by polymerization so that in a few weeks the darkened product cannot be used where a pure aldehyde is required. However, the 2,4,6-tribenzyl-s-trioxane which may be made from phenylacetaldehyde is stable, even during long periods of storage, and phenylacetaldehyde may be regenerated rapidly and in good yield from its trioxane. The preparation of 2,4,6-tribenzyl-s-trioxane in high yield and purity and the subsequent regeneration of phenylacetaldehyde in pure form from the trioxane compound is much to be desired.

According to the invention, phenylacetaldehyde is converted to 2,4,6-tribenzyl-s-trioxane by the catalytic action of a material of the class consisting of hydrogen fluoride, boron trifluoride, and compounds (such, for example, as hydrofluoroboric acid or hydrofluorosilicic acid) which generate either of these catalytic agents. The trioxane compound is separated from the reaction mixture and may be stored indefinitely without deterioration. Phenylacetaldehyde is then regenerated in pure form from the trioxane by rapid distillation of the latter at atmospheric pressure.

In the method of the present invention, the first step of catalyzing polymerization of phenylacetaldehyde to its trioxane may be carried out with or without a solvent medium. If the separation of a substantially pure trioxane is desired, the reaction mixture should preferably be diluted with an amount of an inert non-ionic solvent sufficient to provide a solution medium. Various inert non-ionic solvents may be employed, some examples of which are benzene, chlorobenzene, carbontetrachloride and petroleum naphtha.

By employing a catalytic amount of hydrogen fluoride, phenylacetaldehyde is converted to the trioxane in high yield in about 2 hours and the polymerization is at least as rapid when using boron trifluoride as the catalyst. The catalytic effect of hydrogen fluoride on phenylacetaldehyde is both surprising and unexpected because catalytic amounts of other mineral acids are relatively ineffective in promoting the formation of the trioxane even after prolonged reaction periods. Furthermore, the catalytic effect of hydrogen fluoride and boron trifluoride on phenylacetaldehyde appears to be specific, for other related aldehyde compounds do not produce the corresponding trioxane derivative under similar conditions of reaction. Amounts of catalyst of about 0.25 to 4 per cent by weight of the total reaction mixture are effective in promoting polymerization, the optimum range being from 0.5 to 3 per cent. Amounts of catalyst greater than 4 per cent may be used, but such larger amounts do not give proportionally improved results. Aqueous hydrogen fluoride is satisfactory but it is preferred to use the anhydrous form, especially when the reaction is carried out in an inert solvent. Residual catalyst may be removed at the end of the reaction by distillation under reduced pressure or by neutralization. Reaction temperatures of about 20° to 50° C. facilitate completion of the polymerization reaction in about 2 hours but lower or higher temperatures (e. g. 0° to 75° C.) may be employed with corresponding longer or shorter reaction times.

Unlike phenylacetaldehyde, the 2,4,6-tribenzyl-s-trioxane, formed in the first step of the new method, may be stored for long periods of time without noticeable deterioration. However, when the trioxane compound is rapidly heated at atmospheric pressure it yields pure phenylacetaldehyde as a distillate. Decomposition of the trimer to phenylacetaldehyde begins at a temperature slightly above the melting point (154°–156° C.) of the trimer. Distillation of the phenylacetaldehyde occurs in its boiling point range of about 195° to 197° C. at atmospheric pressure. During the heating of the trimer to effect distillation of the aldehyde, the temperature of the boiling liquid in the still rises to a point considerably above the decomposition temperature of the trimer, often to 230° C. or higher. Prolonged heating at these higher temperatures promotes the formation of higher molecular weight polymers during the distillation. For this reason it is imperative to execute the distillation as rapidly as possible to obtain high yields of pure phenylacetaldehyde.

This invention will be more fully described by the following examples which illustrate methods of practicing the invention. Examples 1 and 2 will describe the polymerization step of the new process whereas Example 3 will describe the aldehyde recovery step.

*Example 1*

180 grams of anhydrous hydrogen fluoride was added to 18 pounds of crude phenylacetaldehyde (80 per cent) and stirred for two hours during which time the temperature rose from 8° C. to 27° C. The mixture was then cooled to 17° C. and an additional 80 grams of hydrogen fluoride was added. The mixture was stirred for an additional hour and a half, during which time the temperature rose to 34° C. The reaction mixture was cooled to 25° C. and the hydrogen fluoride was neutralized with an aqueous solution of potassium carbonate, with stirring. The thick sticky mixture was thinned out with methanol and filtered. The crude product was dissolved in hot chlorobenzene, filtered and cooled overnight. The 2,4,6-tribenzyl-s-trioxane which crystallized out of the chlorobenzene was removed by filtration, washed with methanol and dried. A yield of 11.2 pounds of the trioxane compound, or 78 per cent by weight, based on the phenylacetaldehyde content of the charge, was obtained. The product had a melting point of 154° to 156° C.

*Example 2*

33 pounds of crude phenylacetaldehyde (87 per cent) was added gradually over a two hour period to a mixture of 500 grams of hydrogen fluoride in 3 gallons of chlorobenzene. During the addition, the temperature rose from 13° to 38° C. The mixture was stirred at 38° C. for one hour, cooled to 17° C. and stirred for an additional hour. The hydrogen fluoride in the mixture was neutralized with an aqueous solution of potassium carbonate and the mixture was then cooled to 5° C. The resulting slurry was filtered and the product was washed with water and subsequently with methanol. A yield of 19.4 pounds of the trioxane compound, or 67.6 per cent by weight based on the phenylacetaldehyde content of the feed, was obtained. The product had a melting point of 154° to 156° C. Similar results are obtained when boron trifluoride is substituted for hydrogen fluoride in the reaction.

*Example 3*

77 grams of pure 2,4,6-tribenzyl-s-trioxane was heated rapidly at atmospheric pressure and the phenylacetaldehyde flash distilled. The pot temperature rose nearly to 290° C. at the end of the distillation, and the distilling vapor temperature remained near 195° to 197° C. A product yield of 71 grams was obtained during 20 minutes of distillation. A sample of the product was titrated and found to be substantially pure phenylacetaldehyde. A yield of 92 per cent by weight, based on the trioxane compound, was obtained.

I claim:

1. The method which comprises subjecting phenylacetaldehyde to the catalytic action of an agent selected from the class consisting of hydrogen fluoride, boron trifluoride, hydrofluoroboric acid and hydrofluorosilicic acid, and recovering 2,4,6-tribenzyl-s-trioxane from the reaction mixture.

2. The method which comprises subjecting phenylacetaldehyde to the action of hydrogen fluoride, and recovering 2,4,6-tribenzyl-s-trioxane from the reaction mixture.

3. The method as claimed in claim 1 wherein an inert non-ionic solvent is employed as reaction medium during the catalytic polymerization of phenylacetaldehyde.

4. The method as claimed in claim 1 wherein phenylacetaldehyde is catalytically polymerized at temperatures between 0° and 75° C.

5. The steps of polymerizing phenylacetaldehyde as in claim 1, separating the 2,4,6-tribenzyl-s-trioxane from the reaction mixture, and subsequently regenerating phenylacetaldehyde from the said trioxane compound by rapid distillation at atmospheric pressure.

6. The method which comprises the steps of polymerizing phenylacetaldehyde in a medium of chlorobenzene in the presence of a catalytic amount of hydrogen fluoride at a temperature between 20° and 50° C., separating 2,4,6-tribenzyl-s-trioxane from the reaction mixture, and subsequently regenerating phenylacetaldehyde from the dried trioxane compound by rapid distillation at atmospheric pressure.

DAVID C. YOUNG.

No references cited.